United States Patent
Chambonneau et al.

(10) Patent No.: US 11,345,206 B2
(45) Date of Patent: May 31, 2022

(54) SUSPENSION THRUST BEARING DEVICE AND SUSPENSION STRUT EQUIPPED WITH SUCH A DEVICE

(71) Applicant: AKTIEBOLAGET SKF, Gothenburg (SE)

(72) Inventors: Charles Chambonneau, Ballan Miré (FR); Francois De Lemps, Saint-Cyr-sur-Loire (FR); Christophe Houdayer, Semblancay (FR); Desire Vidot, Ballan-Miré (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/850,511

(22) Filed: Apr. 16, 2020

(65) Prior Publication Data
US 2020/0384821 A1   Dec. 10, 2020

(30) Foreign Application Priority Data

Jun. 6, 2019   (DE) .......................... 102019208307.2

(51) Int. Cl.
*B60G 15/06* (2006.01)
(52) U.S. Cl.
CPC ......... *B60G 15/063* (2013.01); *B60G 15/068* (2013.01); *B60G 2204/418* (2013.01)
(58) Field of Classification Search
CPC ............... B60G 15/063; B60G 15/068; B60G 2204/418; B60G 2204/128; B60G 15/02
See application file for complete search history.

(56) References Cited

U.S. PATENT DOCUMENTS

| | | | | |
|---|---|---|---|---|
| 5,788,262 A * | 8/1998 | Dazy | ................... | B60G 15/063 188/321.11 |
| 6,257,605 B1 * | 7/2001 | Zernickel | ............. | B60G 15/063 267/220 |
| 6,398,201 B1 * | 6/2002 | Solomond | ........... | B60G 15/063 267/170 |
| 6,948,728 B2 * | 9/2005 | Pflugner | ............... | B60G 15/00 267/220 |
| 8,348,029 B2 * | 1/2013 | Winocur | ............. | B60G 15/068 188/322.12 |

(Continued)

FOREIGN PATENT DOCUMENTS

| | | | | |
|---|---|---|---|---|
| DE | 102007024628 A1 * | 12/2007 | .......... | B60G 15/068 |
| FR | 2783203 A1 * | 3/2000 | .......... | B60G 15/068 |
| FR | 2910944 A1 * | 7/2008 | ............ | F16C 33/761 |

*Primary Examiner* — Paul N Dickson
*Assistant Examiner* — Kurtis Nielson
(74) *Attorney, Agent, or Firm* — J-Tek Law PLLC; Scott T. Wakeman; Mark A. Ussai

(57) ABSTRACT

A suspension thrust bearing device for use with a suspension spring in an automotive suspension strut of a vehicle includes a bearing having an upper annular bearing member and a lower annular bearing member configured for relative rotation. The lower annular bearing member has a radial surface and a resilient damper overmolded to the radial surface, which damper has a lower support surface configured to axially support an end coil of the suspension spring. The lower support surface has at least one high portion and at least one low portion that form a waveform, such as a square wave or a sinusoidal wave, in a peripheral direction.

11 Claims, 2 Drawing Sheets

(56) References Cited

U.S. PATENT DOCUMENTS

| | | | |
|---|---|---|---|
| 8,459,621 B2 * | 6/2013 | Cook | C09D 5/4465 |
| | | | 267/220 |
| 8,678,361 B2 * | 3/2014 | Kim | F16F 9/54 |
| | | | 267/195 |
| 8,876,398 B2 | 11/2014 | Corbett et al. | |
| 9,873,303 B2 * | 1/2018 | Broeckx | B60G 15/063 |
| 9,964,145 B2 * | 5/2018 | Lepine | B60G 15/068 |
| 10,626,942 B2 * | 4/2020 | Ohmura | B60G 11/16 |
| 10,753,389 B2 | 8/2020 | Blanchard et al. | |
| 2006/0215945 A1 * | 9/2006 | Miyata | F16C 17/10 |
| | | | 384/420 |
| 2010/0014792 A1 | 1/2010 | Kellam | |
| 2013/0147149 A1 * | 6/2013 | Baker | B60G 15/063 |
| | | | 280/124.155 |
| 2013/0195393 A1 | 8/2013 | Corbett et al. | |
| 2013/0270790 A1 * | 10/2013 | Morishige | F16C 17/04 |
| | | | 280/124.155 |
| 2013/0277161 A1 | 10/2013 | Bussit et al. | |
| 2014/0265081 A1 * | 9/2014 | Nakano | F16F 1/126 |
| | | | 267/220 |
| 2016/0031280 A1 * | 2/2016 | Arano | B60G 15/065 |
| | | | 267/219 |
| 2016/0052358 A1 * | 2/2016 | Itsuji | B60G 11/14 |
| | | | 267/33 |
| 2016/0089946 A1 | 3/2016 | Bedeau et al. | |
| 2016/0089947 A1 * | 3/2016 | Bedeau | F16C 33/761 |
| | | | 248/634 |
| 2016/0243915 A1 | 8/2016 | Bedeau et al. | |
| 2017/0261032 A1 * | 9/2017 | Lepine | F16C 19/12 |
| 2018/0372152 A1 | 12/2018 | Gaultier et al. | |
| 2019/0308479 A1 | 10/2019 | Montboeuf et al. | |
| 2020/0189344 A1 * | 6/2020 | De Lemps | B60G 15/02 |
| 2020/0231015 A1 | 7/2020 | Blanchard et al. | |
| 2020/0240465 A1 | 7/2020 | Blanchard et al. | |
| 2021/0010538 A1 | 1/2021 | Chambonneau et al. | |
| 2021/0107327 A1 * | 4/2021 | Blanchard | F16C 19/10 |

* cited by examiner

SUSPENSION THRUST BEARING DEVICE AND SUSPENSION STRUT EQUIPPED WITH SUCH A DEVICE

TECHNICAL FIELD

The present disclosure is directed to a suspension thrust bearing device, in particular of the MacPherson type ("MacPherson Suspension Bearing Unit" or MSBU). The disclosure also relates to a strut for a motor vehicle comprising a damper and such a suspension thrust bearing device. The field of the invention is that of suspension systems, notably motor-vehicle suspension systems.

BACKGROUND OF THE INVENTION

In a known manner, a motor vehicle suspension system comprises a suspension strut supporting an axle and a vehicle wheel. A suspension thrust bearing device is disposed in an upper portion of said suspension strut, opposite to the wheel and the ground, and between a suspension spring and an upper support block attached to the vehicle chassis.

The suspension thrust bearing device includes at least one bearing, for example a rolling bearing, comprising upper and lower annular bearing members configured for relative rotation around a main axis.

The suspension thrust bearing device enables transmission of axial forces between the spring and the body of the vehicle and, in the meantime, allows relative angular movement between the spring, which is mobile in rotation, and the fixed support block attached to the body.

The damping function of the suspension thrust bearing device can be improved using a damping element (or damper) made of resilient material and mounted between the lower annular bearing member and the suspension spring. Such a damping element absorbs shocks and vibrations exerted by the spring to the thrust bearing device. In a known manner, a good compromise has to be found between the material, axial thickness of the damping element and the compactness of the device to ensure optimized static and dynamic stiffness.

SUMMARY

An aspect of the disclosure is to overcome these drawbacks with an enhanced suspension thrust bearing device. It is desirable to provide a suspension thrust bearing device which is relatively inexpensive, has a good operational reliability, and has an increased service life.

To this end, the disclosure relates to a suspension thrust bearing device, for use with a suspension spring in an automotive suspension strut of a vehicle. The suspension thrust bearing device comprises a bearing having upper and lower annular bearing members in relative rotation. Lower annular bearing member comprises a radial body.

The suspension thrust bearing device further comprises a damping element (or damper) made of resilient material and overmolded to the radial body of lower annular bearing member. Said damping element has a lower support surface to axially support an end coil of the suspension spring.

According to the disclosure, the lower support surface comprises at least one high and one low to generate a waveform in the peripheral direction.

Thanks to the disclosure, a suspension spring transmits roadway shocks and vibrations to the suspension thrust bearing device through the damping element, and more particularly through the lower support surface. The special shape of this lower support surface with highs and lows in the peripheral direction uniformly dampens the transmission of such shocks and vibrations.

A further advantage is that the suspension spring only contacts the highs of the lower support surface of the damping element, material deformation of said highs being received by circumferentially adjacent lows. Damping properties of the damping element are then improved.

According to further aspects of the disclosure which are advantageous but not compulsory, such a suspension thrust bearing device may incorporate one or several of the following features:

The suspension thrust bearing device comprises a bearing with a first ring fixed to an upper cap, so as to form the upper annular bearing member of the suspension thrust bearing, and a second ring fixed to a lower cap, so as to form the lower annular bearing member of the suspension thrust bearing, the first and second rings being relatively rotatable.

The bearing is a rolling bearing, the first and second rings defining an annular rolling chamber between them and at least one row of rolling elements being disposed within said rolling chamber.

The rolling elements are balls.

The first and second rings are made from a stamped metal sheet.

The upper and lower caps are made from a rigid plastic material.

The lower cap comprises the radial body.

The lower cap comprises an axial hub that extends axially downwardly from the inner side of said radial body.

The damping element comprises rubber thermoplastic elastomer (TPE), in particular thermoplastic polyurethane (TPU), melt processable elastomer (MPE) or elastomer cellular foam.

The damping element comprises a plurality of alternate highs and lows in the peripheral direction.

Highs are equally spaced in the peripheral direction.

The waveform of highs and lows is sinusoidal, rectangular or trapezoidally shaped in the peripheral direction.

The ratio between the low width and the low depth is from 1 to 2.

The ratio between the high width and the low width is from 1 to 5.

The disclosure also relates to a motor vehicle suspension strut comprising a damper rod, a suspension spring, and a suspension thrust bearing device as mentioned above.

BRIEF DESCRIPTION OF THE DRAWINGS

The disclosure will now be explained in correspondence with the annexed figures, as an illustrative example, without restricting the disclosure. In the annexed figures.

DETAILED DESCRIPTION

Figure 1:
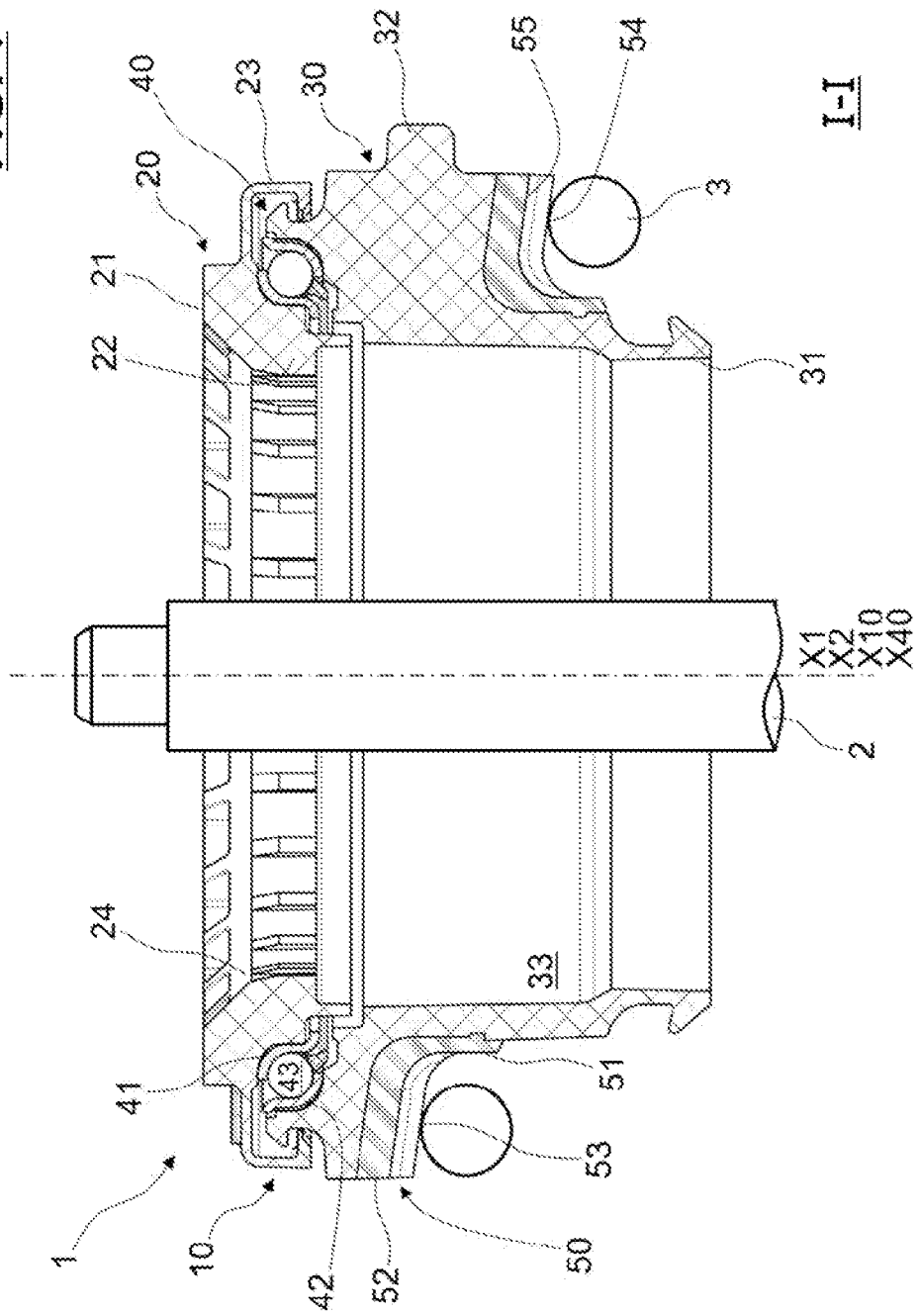
FIG. 1 is a sectional view of a suspension strut according to the disclosure, comprising a suspension thrust bearing unit also according to a first embodiment of the disclosure, and a damper rod and a suspension spring.

A suspension strut 1, partially shown in FIG. 1, is incorporated into a motor-vehicle suspension system. The suspension strut 1 supports a vehicle axle and wheel which are not shown for the purposes of simplification. The suspension strut 1 extends along a main axis X1, placed in substantially vertical direction when the wheel of the vehicle rests on flat ground. The suspension strut 1 comprises a damper piston including a piston body and a damper rod 2 of axis X2, a coil suspension spring 3 and a suspension thrust bearing device 10. The rod 2 and the spring 3 are partially shown in FIG. 1, while the piston body is not shown for the purposes of simplification.

The suspension thrust bearing device 10 with main axis X10 is mounted between the spring 3 and a support block (not shown) connected to the chassis of a motor vehicle. The axes X2 and X10 coincide with the main axis X1 when the suspension system of the vehicle is at rest, as illustrated in FIG. 1.

Hereinafter, the adjectives "axial" and "radial" are defined relative to the main axis X10 of the annular thrust bearing device 10.

The suspension thrust bearing device 10 comprises an upper cap 20, a lower cap 30 and a single rolling bearing 40. In this embodiment, these three components 20, 30 and 40 are of globally circular shape about a main axis X40 coinciding with the main axis X10 when the suspension system of the vehicle is at rest.

The upper cap 20 is a one-piece part made from plastic synthetic material, for example from polyamide, optionally reinforced with glass fibers. The upper cap 20 has a radially-extending flange 21, an inner axially-extending hub 22 of relatively small diameter and extending towards the lower side of the suspension thrust bearing device 10, and an outer axially-extending skirt 23 of relatively large diameter and extending towards the lower side of the suspension thrust bearing device 10. The inner hub 22 defines an inner bore 24 for the suspension thrust bearing device 10 wherein the damper rod 2 is mounted.

The upper cap 20 is configured to be fixed to a support block of the automotive vehicle chassis.

The rolling bearing 40 comprises a pressed sheet metal inner race 41, an outer race 42 also of pressed sheet metal, a row of rolling elements 43, here balls, and a cage (not referenced) for maintaining a regular circumferential spacing between the rolling elements 43. The rolling elements 43 are disposed in a rolling chamber defined between raceways formed by toroidal portions of the inner race 41 and outer race 42.

As an alternative not shown, no rolling elements need to be used but rather the inner and outer races may directly contact each other, with a suitable low friction material, coating, or lubricant being used.

The rolling bearing 40 is integrally radially located between the inner hub 22 and the outer skirt 23 of the upper cap 20. The outer race 42 is fitted within a toroidal inner portion of the lower cap 30. The outer race 42 and the lower cap 30 form a lower annular bearing member. The inner race 41 is fitted onto a toroidal outer portion provided on the lower side of flange 21 of the upper cap 20. The inner race 41 and the upper cap 20 form an upper annular bearing member. The upper and lower annular bearing members are configured for relative rotation with respect to the axis X40.

The lower cap 30 comprises an axially-extending hub 31 defining an inner bore 33 wherein the rod 2 axially extends. The lower cap 30 further comprises a radial body 32 that radially outwardly extends from said hub 31. The toroidal outer portion supporting the inner race 41 of the rolling bearing 40 is provided on an upper surface of said radial body 32.

The upper cap 20 and the lower cap 30 are advantageously made of rigid plastic material, for example PA66 reinforced with glass fibers.

The lower cap 30 is further provided with a damper 50 made from a resilient material so as to enable vibrations to be filtered.

The damper 50 comprises a tubular axial portion 51 and a radial portion 52. The radial portion 52 is tightly fastened to the lower side of the radial body 32 of the lower cap 30. The radial portion 52 comprises a lower support surface 53 for receiving an end turn of the suspension spring 3 in bearing contact. Said radial portion 52 of the damper 50 supports axial load and shocks from the suspension spring 3.

The tubular axial portion 51 axially extends from the radial portion 52 towards the lower side of the suspension thrust bearing device 10. Said tubular axial portion 51 is tightly fastened to an outer cylindrical surface of the hub 31 of the lower cap 30. Said tubular axial portion 51 of the damper 50 supports radial load and shocks from the suspension spring 2.

The tubular axial portion 51 and radial portion 52 of the damper 50 are connected together so as to cover the exterior surface of the axial hub 31 and the radial body 32 of the lower cap 30.

The damper 50 is made from a resilient material, such as rubber thermoplastic elastomer (TPE), in particular thermoplastic polyurethane (TPU), melt processible elastomer (MPE) or elastomer cellular foam. The damper 50 is overmolded onto the lower cap 30.

Figure 2:
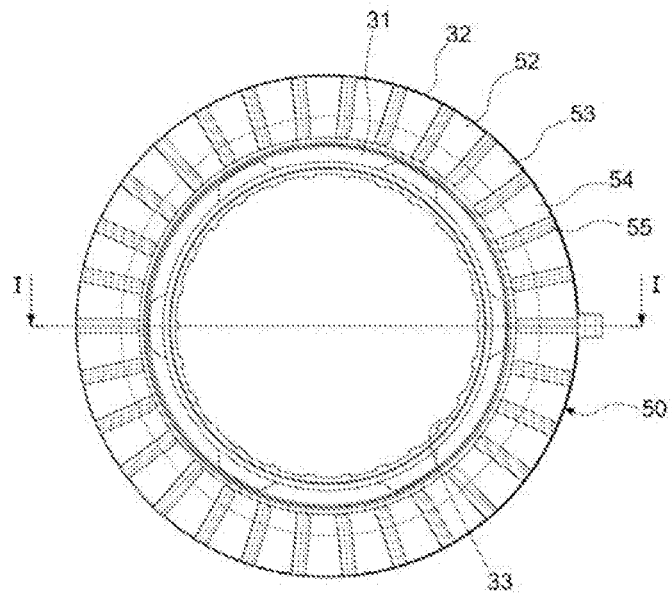
FIG. 2 is a lower perspective view of the suspension thrust bearing unit of FIG. 1.

According to the disclosure, the lower support surface 53 comprises a plurality of highs 54 and lows 55 to generate a waveform in the peripheral direction. As illustrated in FIG. 2, a high 54 is circumferentially surrounded by two lows 55 and, vice versa, a low 55 is surrounded by two highs 54.

The suspension spring 3 comes in direct contact with end surfaces of highs 54. The waveform-shaped lower support surface uniformly dampens the transmission of shocks and vibrations exerted axially by suspension spring 3.

Moreover, the highs 54 are deformed axially and radially when said shocks or vibrations are axially exerted by suspension spring 3 onto damper 50. Material deformation of the highs 54 are received by circumferentially adjacent lows 55. Damping properties of the damper 50 are then improved.

In the illustrated embodiment, the highs 54 are equally spaced in the peripheral direction. Hence, the lows 55 are equally spaced in the peripheral direction. The damping of the damper element 50 can be matched to a specific frequency range of the vibrations and especially to the acoustically audible frequency range. According to an embodiment not illustrated, the highs and lows may be unevenly distributed in the peripheral direction.

Figure 3:
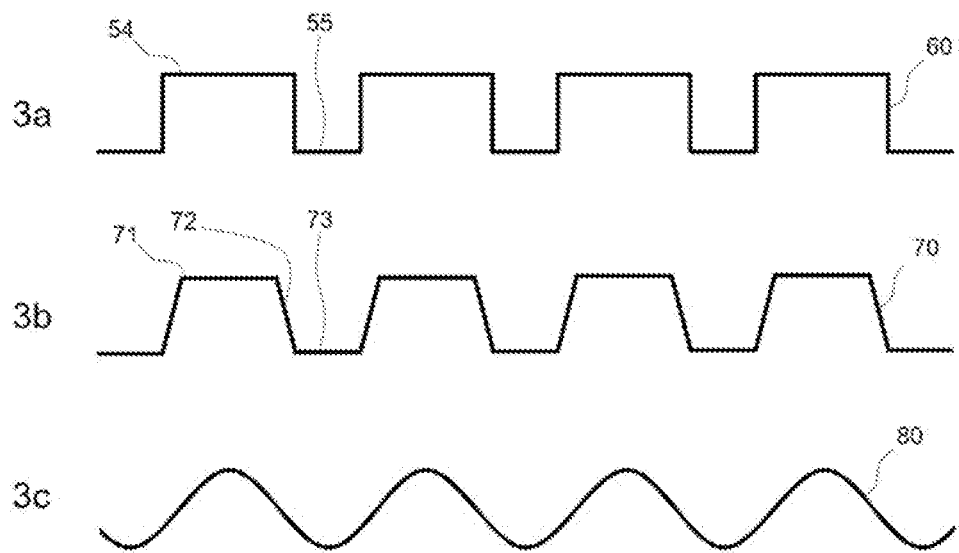
FIG. 3 shows schematic views of waveform shapes provided to a thrust bearing unit.

FIG. 3a schematically shows a rectangularly-shaped waveform 60 and how this waveform can be configured as the contour of a lower support surface 53 of damper 50 over the periphery.

FIG. 3b schematically shows a trapezoidally-shaped waveform 70 wherein highs 71 comprise inclined side walls 72. Lows 73 have an opening of larger length compared to the bottom wall in the peripheral direction. Such a waveform 70 is particularly suitable for overmolded damper 50, the mold being easily removable.

FIG. 3c shows schematically a sinusoidally-shaped waveform 80. The contour of the lower support surface 53 is, however, not limited to the above-mentioned waveforms. Any desired combination of these waveforms as a new contour is possible.

Advantageously, the ratio between the low width and the low depth is from 1 to 2. Advantageously, the ratio between the high width and the low width is from 1 to 5.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improved cam follower roller device.

Moreover, various features of the above-described representative examples, as well as the various independent and dependent claims below, may be combined in ways that are not specifically and explicitly enumerated in order to provide additional useful embodiments of the present teachings.

What is claimed is:

1. A suspension thrust bearing device for use with a suspension spring in an automotive suspension strut, comprising:
   a bearing having an upper annular bearing member and a lower annular bearing member configured for relative rotation, the lower annular bearing member comprising a radial surface, and
   a resilient damper overmolded to the radial surface of the lower annular bearing member, said damper having a lower support surface configured to axially support an end coil of the suspension spring,
   wherein the lower support surface has at least one high portion and at least one low portion that form a waveform in a peripheral direction such that a circular path on the lower support surface overlies each of the high portions and the low portions.

2. The device according to claim 1, wherein the at least one high portion and at least one low portion comprise a plurality of the high portions and a plurality of the low portions alternating in the peripheral direction.

3. The device according to claim 2, wherein the high portions are equally spaced in the peripheral direction.

4. The device according to claim 2, wherein the waveform is sinusoidal.

5. The device according to claim 2, wherein the waveform is rectangular.

6. The device according to claim 2, wherein the waveform is trapezoidal.

7. The device according to claim 2, wherein a ratio of a width of one of the low portions to a depth of one of the low portions is from 1 to 2.

8. The device according claim 2, wherein a ratio of a width of one of the high portions to a width of one of the low portions is from 1 to 5.

9. The device according to claim 2, wherein the damper comprises rubber thermoplastic elastomer (TPE) or thermoplastic polyurethane (TPU) or melt processible elastomer (MPE) or elastomer cellular foam.

10. An automotive suspension strut comprising:
    a damper rod,
    the suspension spring, and
    the suspension thrust bearing device according to claim 2.

11. A suspension thrust bearing device, for use with a suspension spring in an automotive suspension strut of a vehicle, comprising:
    a bearing having an upper annular bearing member and a lower annular bearing member configured for relative rotation, the lower annular bearing member comprising a radial surface, and
    a resilient damper overmolded to the radial surface of the lower annular bearing member, said damper having a lower support surface configured to axially support an end coil of the suspension spring,
    wherein the lower support surface is crenelated or undulating in a peripheral direction such that a circumferential path on the lower support surface follows a square waveform or a trapezoidal waveform or a sinusoidal waveform.

* * * * *